US009322925B2

(12) United States Patent
Babitch et al.

(10) Patent No.: US 9,322,925 B2
(45) Date of Patent: *Apr. 26, 2016

(54) SYSTEMS AND METHODS FOR MANAGING POWER CONSUMPTION

(75) Inventors: Daniel Babitch, San Jose, CA (US); Steven A. Gronemeyer, Cedar Rapids, IA (US)

(73) Assignee: Qualcomm Technologies International, Ltd., Cambridge (GB)

( * ) Notice: Subject to any disclaimer, the term of this patent is extended or adjusted under 35 U.S.C. 154(b) by 433 days.

This patent is subject to a terminal disclaimer.

(21) Appl. No.: 12/412,614

(22) Filed: Mar. 27, 2009

(65) Prior Publication Data

US 2010/0250129 A1  Sep. 30, 2010

(51) Int. Cl.
*G01S 19/34* (2010.01)
*G06F 1/32* (2006.01)

(52) U.S. Cl.
CPC .. *G01S 19/34* (2013.01); *G06F 1/32* (2013.01)

(58) Field of Classification Search
CPC combination set(s) only.
See application file for complete search history.

(56) References Cited

U.S. PATENT DOCUMENTS

| 5,629,708 A | 5/1997 | Rodal et al. |
| 5,864,315 A | 1/1999 | Welles, II |
| 6,985,811 B2 | 1/2006 | Gronemeyer |
| 8,185,083 B2 | 5/2012 | Babitch et al. |
| 2007/0298289 A1* | 12/2007 | Clingerman et al. ........... 429/13 |
| 2012/0184236 A1 | 7/2012 | Babitch et al. |

FOREIGN PATENT DOCUMENTS

| EP | 1462885 | 9/2004 |
| WO | 03038464 A2 | 5/2003 |
| WO | 03038464 A3 | 5/2003 |
| WO | 03050558 A3 | 6/2003 |
| WO | WO-03050558 A2 | 6/2003 |
| WO | 2005001388 A2 | 1/2005 |
| WO | 2007076541 A2 | 7/2007 |
| WO | 2007076541 A3 | 7/2007 |

* cited by examiner

*Primary Examiner* — Luna Champagne
(74) *Attorney, Agent, or Firm* — Mahamedi Paradice LLP (57) ABSTRACT

GPS navigation devices or GPS receivers can consume less power by using a temperature recorder circuit and/or a power manager in calculating the accuracies of the GPS system time and reference frequency to improve battery life. A representative receiver includes a time reference device that generates data associated with a GPS system time, and a temperature recorder circuit that operates using the generated data from the time reference device and monitors the temperature of the time reference device while the receiver hibernates. The receiver further includes memory including a power manager that has instructions, which are processed by a processing device after the receiver wakes up. The instructions associated with the power manager include determining if the temperature recorder circuit sent a wake-up signal, reading data from the temperature recorder circuit, and adjusting parameters associated with at least one of the following: the time reference device and the temperature recorder circuit.

20 Claims, 10 Drawing Sheets

SYSTEMS AND METHODS FOR MANAGING POWER CONSUMPTION

TECHNICAL FIELD

The present disclosure is generally related to global positioning system (GPS) technology and, more particularly, is related to systems and methods for managing power consumption.

BACKGROUND

Today, it is important to consumers that portable devices have a long battery life. Many portable devices include GPS receivers that enable the consumers to navigate from one place to another. GPS acquisition performance is typically limited by four items of information:
 a) The accuracy of a reference frequency on a GPS receiver
 b) The accuracy of the GPS receiver time relative to GPS system time
 c) Availability of currently valid Ephemeris information (high precision satellite orbital parameters.)
 d) The accuracy of an initial position estimate of the GPS receiver GPS navigation devices consume a fair amount of power to realize high speed GPS acquisition performance, resulting in shorter battery life for GPS devices. Currently, the available techniques for improving the above items a) and b) are limited with respect to power consumption.

For example, the reference frequency often comes from a temperature compensated crystal oscillator (TCXO) in most GPS receivers. The TCXO typically runs when the GPS receiver is running and not when the GPS receiver hibernates because the TCXO can use too much power if it is left always on. It is a much more accurate frequency reference than a real time clock (RTC) crystal oscillator. But since the TCXO cannot be left always on, the TCXO cannot be used for a time reference, because when the power is off, a time counter using that reference frequency would stop. The RTC crystal oscillator is typically used as a time reference for the above reasons, among others.

Currently, the accuracy of time from the RTC crystal oscillator is typically limited by unknown frequency excursions, among other factors. Such unknown frequency excursions are typically dominated by temperature changes at the RTC crystal oscillator, during the time when the RTC crystal oscillator cannot otherwise be calibrated to a more accurate time reference because the GPS is shut off (in hibernate mode) to save battery power. If an external source of time is available, such as from a radio network, then the time accuracy is limited to the accuracy of the network source. Sometimes the network time is not available, or not very accurate for the purpose of this application.

The knowledge of the reference frequency is typically limited by the accuracy and environmental (temperature) stability of the reference TCXO. Frequency can also be derived from some network radio receivers, but this may not be quick, easy to implement, accurate, or even available.

SUMMARY

GPS navigation devices or GPS receivers can consume less power by using a temperature recorder circuit and/or a power manager in calculating the accuracies of the GPS receiver time and reference frequency to improve battery life. A representative receiver includes a time reference device that generates data associated with a GPS receiver time, and a temperature recorder circuit that operates using the generated data from the time reference device and monitors the temperature of the time reference device while the receiver hibernates. The receiver further includes memory including a power manager that has instructions, which are processed by a processing device after the receiver wakes up. The instructions associated with the power manager include determining if the temperature recorder circuit sent a wake-up signal, reading data from the temperature recorder circuit, and adjusting parameters associated with at least one of the following: the time reference device and the temperature recorder circuit.

Other systems, devices, methods, features of the invention will be or will become apparent to one skilled in the art upon examination of the following figures and detailed description. It is intended that all such systems, methods, features be included within the scope of the invention, and be protected by the accompanying claims.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which the uncertainties of local estimates of receiver time and frequency are reduced using GPS measurements and frequency and time calibrations based on GPS measurements and navigation solutions.

Figure 1:
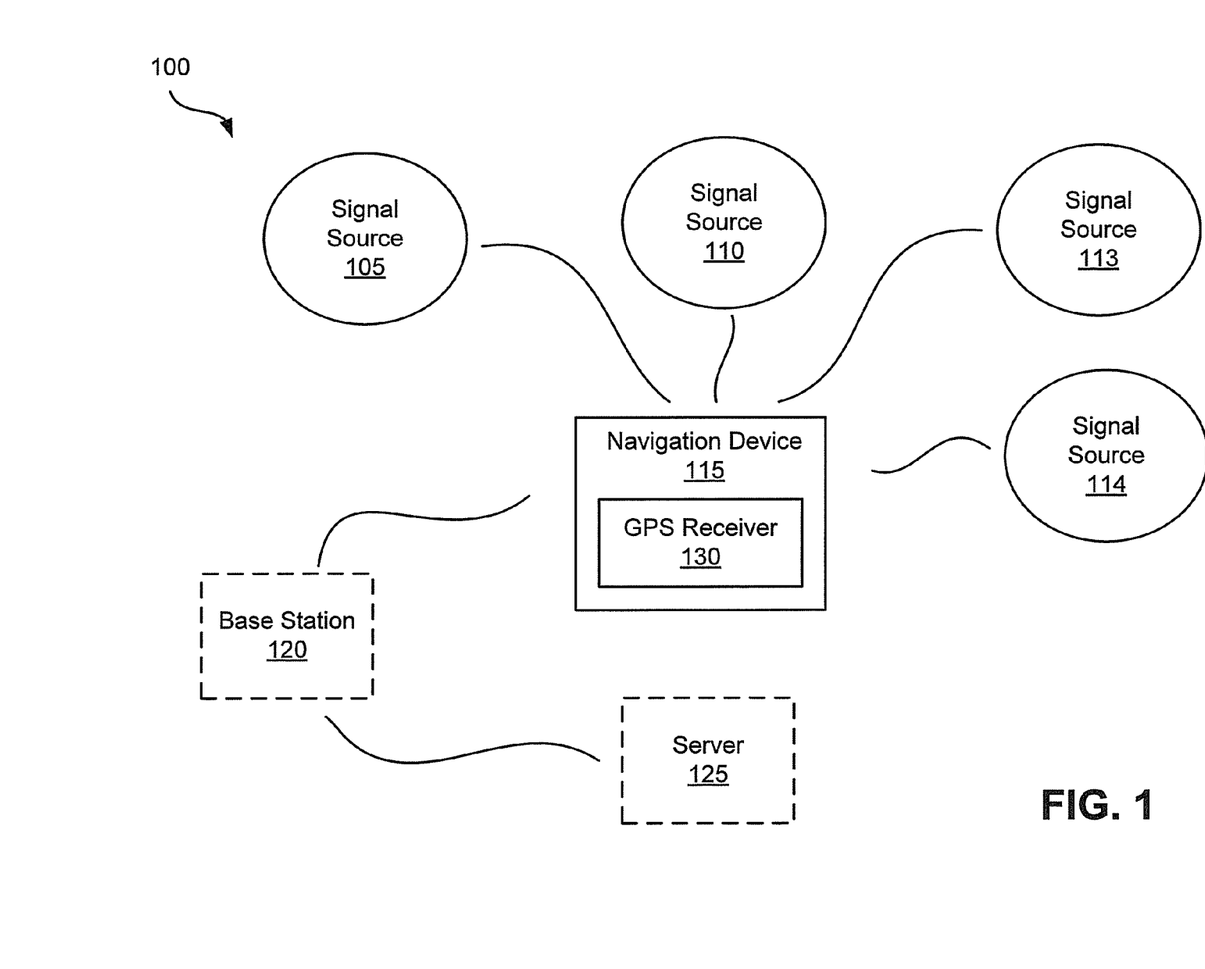
FIG. 1 is a block diagram that illustrates a system having a global positioning system (GPS) navigation device that improves accuracies of the GPS receiver time and the reference frequency while conserving power consumption using a temperature recorder circuit and a power manager.
Figure 3:
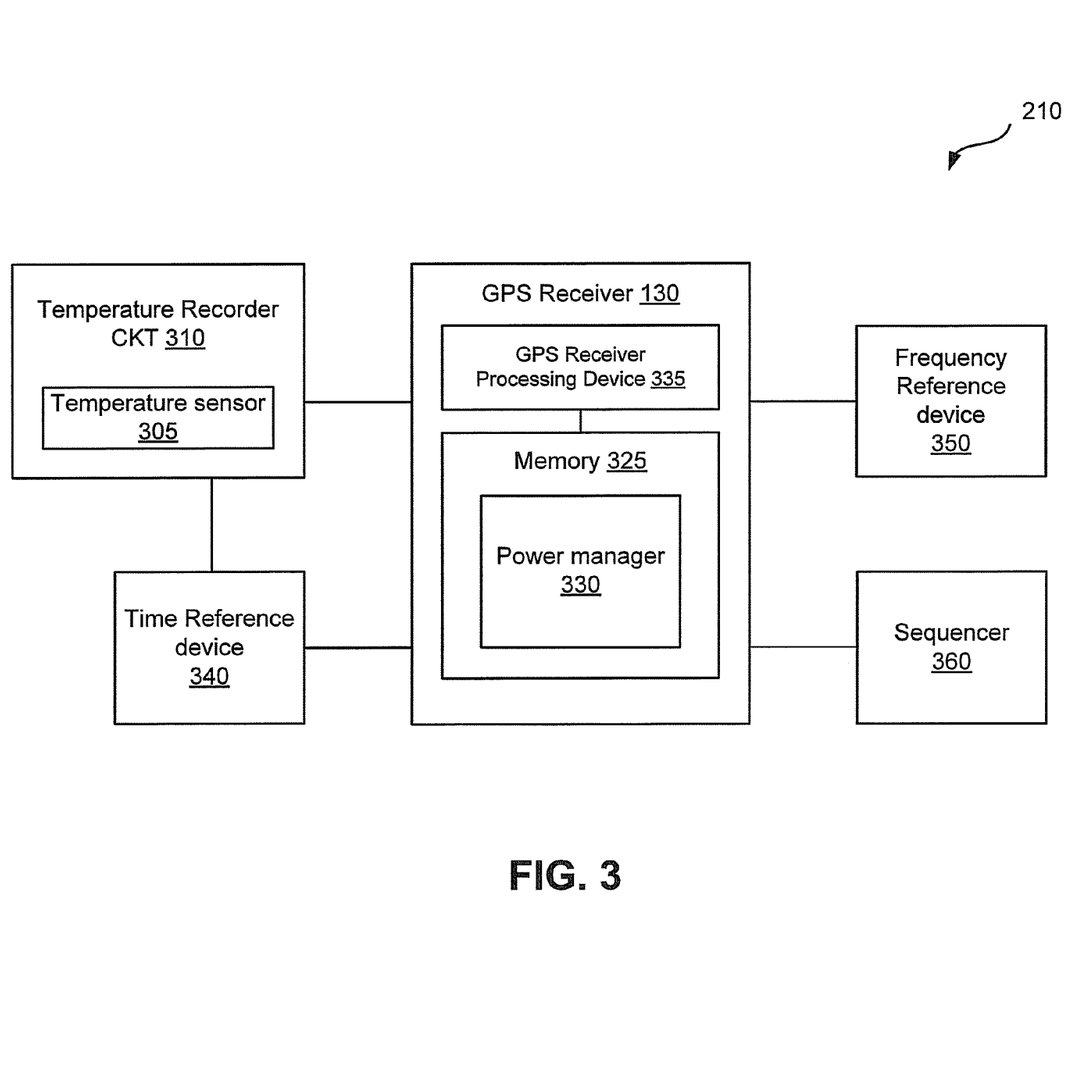
FIG. 3 is a block diagram that illustrates an embodiment of a GPS signal processing system, such as that shown in FIG. 2, which includes a temperature recorder circuit and a power manager.

FIG. 1 is a block diagram that illustrates a system 100 having a global positioning system (GPS) navigation device 115 that improves accuracies of the GPS receiver time and the reference frequency while conserving power consumption using a temperature recorder circuit 310 (FIG. 3) and a power manager 330 (FIG. 3). A simple system 100 includes a plurality of signal sources 105, 110, 113, 114 and a navigation device 115. Alternatively or additionally, a more complex system 100, such as an assisted global positioning system (AGPS), further comprises a base station 120 and a server 125. Although only one navigation device 115, one base station 120, and one server 125 are shown in the system 100, the system 100 can include multiple navigation devices, multiple base stations and/or multiple servers. Alternatively or additionally, the server 125 may be co-located with the base station 120 (e.g., Server Generated Extended Ephemeris) or with the navigation device 115 (e.g., Client Generated Extended Ephemeris).

The signal sources 105, 110, 113, 114 include GPS satellites (also known as space vehicles), among others. The signal sources 105, 110, 113, 114 generally orbit above the location of the navigation devices 115 at any given time. The navigation devices 115 include, but are not limited to, GPS receivers 130, cell phones with embedded signal receivers, and personal digital assistants (PDAs) with embedded signal receivers, among others. The navigation devices 115 further includes a temperature recorder circuit 310 and a power manager 330, both of which are described further in relation to FIGS. 3-5 and FIGS. 3-10, respectively. The signal sources 105, 110, 113, 114 transmit signals to the navigation devices 115, which use the signals to determine the location, speed, heading and time of the navigation devices 115.

In an AGPS system, a GPS assistance server 125 assists the navigation devices 115, such as a Mobile Station (MS) client (e.g., a cellular phone) in obtaining a position fix on the client's position. In one embodiment of the AGPS, the MS client 115 sends GPS measurements to the GPS server 125, which then calculates the client's position. For an accurate 3-D position fix the MS client 115 generally receives signals from four satellites 105, 110, 113, 114.

Figure 2:
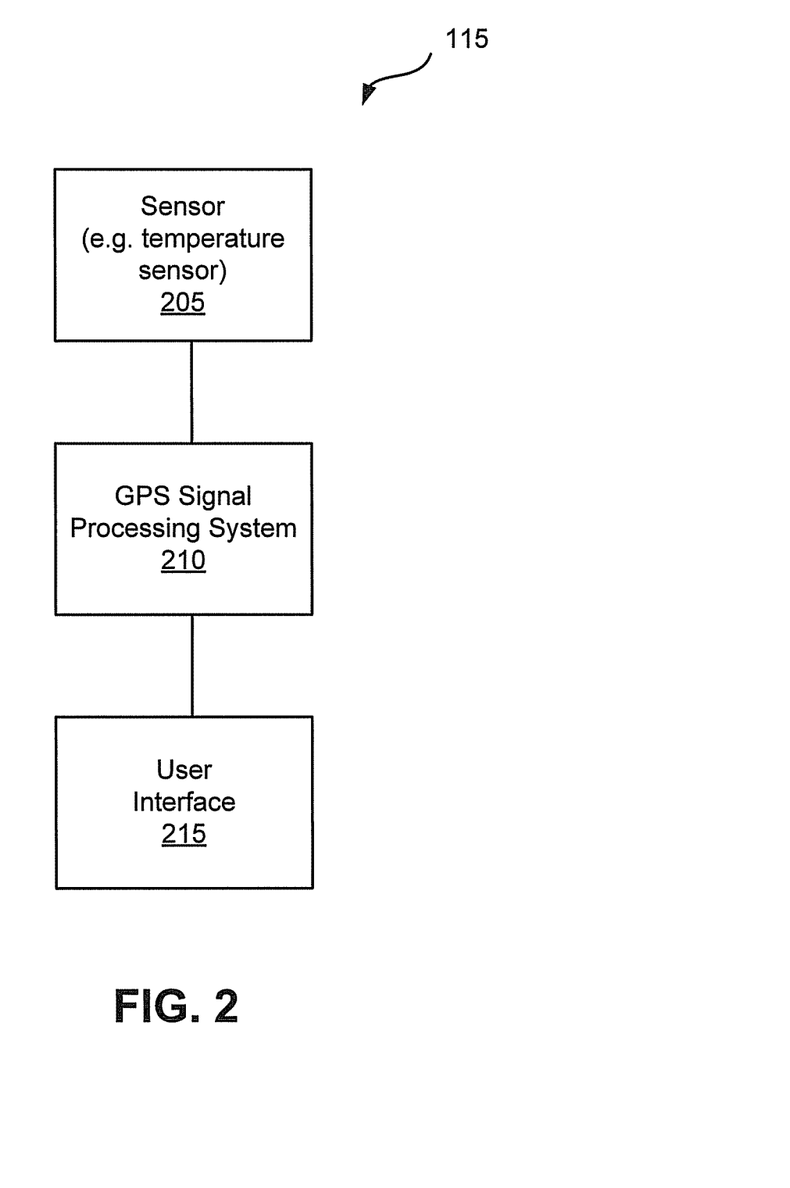
FIG. 2 is a high-level block diagram that illustrates an embodiment of a navigation device, such as that shown in FIG. 1.

FIG. 2 is a high-level block diagram that illustrates an embodiment of a navigation device 115, such as that shown in FIG. 1. The navigation device 115 includes, but is not limited to, sensor(s) 205, a GPS signal processing system 210, and a user interface 215. It should be noted that some sensors 205 may not be included in some navigation devices 115. The sensor 205 can include, but is not limited to, temperature sensors 305 (FIG. 3) and inertial sensors that include, for example, micro-electromechanical system (MEMS) sensors, among others.

The GPS signal processing system 210 can compute position fixes using a current working hypothesis of a location based on prior navigation. The GPS signal processing system 210 obtains at least one GPS range measurement. With at least one range measurement, a timing receiver can update the GPS receiver time and frequency, based on the position hypothesis. If the current position hypothesis is not available, the GPS signal processing system 210 uses at least three (3) and possibly more satellite acquisitions and range measurements to calculate the position fix.

The GPS signal processing system 210 can include, but is not limited to, a GPS receiver 130, a temperature recorder circuit 310 (FIG. 3) and a power manager 330 (FIG. 3), among others. In general, the GPS receiver 130 is capable of computing position fixes. The GPS receiver 130 can be designed to electrically couple to the temperature recorder circuit 310 and the power manager 330, both of which facilitates improving the accuracy of the GPS receiver time and reference frequency while conserving power consumption. The temperature recorder circuit 310 and the power manager 330 are further described in relation to FIG. 3.

FIG. 3 is a block diagram that illustrates an embodiment of a GPS signal processing system 210, such as that shown in FIG. 2, which includes a temperature recorder circuit 310 and a power manager 330. In this example, the GPS signal processing system 210 includes a GPS receiver 130 having memory 325 that contains the power manager 330 and a GPS receiver processing device 335 that executes the power manager 330. The GPS receiver 130 is electrically coupled to the temperature recorder circuit 310, time reference device 340, frequency reference device 350, and sequencer 360, among others.

The time reference device 340 and temperature recorder circuit 310 operate regardless of whether or not the navigation device 115 hibernates. The time reference device 340 generates clock signals while and the temperature recorder circuit 310 receives and operates using the clock signals from the time reference device 340. The temperature recorder circuit 310 is designed to send a wake-up signal to the GPS signal processing system 210, the frequency reference device 350, and other electrical components of the GPS receiver 130 to wake up the GPS receiver 130.

The temperature recorder circuit 310 includes a temperature sensor 305 that senses the temperature of the time reference device 340 and/or a frequency reference device 350 and generates data associated with a temperature change of the time reference device 340 or the frequency reference device 350. In this example, the time reference device 340 and the frequency reference device 350 are shown to be implemented as physically separate devices from the GPS receiver 130, and separate from each other. However, one skilled in the art would appreciate the various combinations of having separate devices or combined devices for the time reference device 340, the frequency reference device 350, and GPS receiver 130.

The temperature sensor 305 can be located, for example, a) on the GPS receiver silicon die 130, b) external to the GPS receiver silicon die 130 on the frequency reference device 350, c) external to the GPS receiver silicon die 130 on the time reference device 340, and d) internal to the temperature recorder circuit 310. It should be noted that although the figures show one temperature sensor 305, one skilled in the art would appreciate using more than one temperature sensors 305 on various electrical components of the navigation device 115. For example, two temperature sensors 305 can be located external to the GPS receiver silicon die 130 each on the frequency reference device 350 and on the time reference device 340. The temperature recorder circuit 310 can measure and store the outputs of one of the two temperature sensors 305, or both.

The processing device 335, such as a microprocessor, is coupled to the memory 325 having the power manager 330. The receiver processing device 335 is designed to wake up after receiving the wake-up signal from the temperature recorder circuit 310 and execute instructions associated with the power manager 330. The instructions associated with the power manager 330 include, for example, determining if the temperature recorder circuit 310 sent a wake-up signal and reading the data from the temperature recorder circuit 310. Based on the read data, the power manager 330 adjusts at least one of the following: the time reference device 340, the frequency reference device 350 and the temperature recorder circuit 310, to improve accuracy of the GPS receiver time and reference frequency, and change operation(s) of the temperature recorder circuit 310. Operations of the power manager 330 are further described in FIGS. 4-10.

A sequencer 360 turns on the GPS receiver 130 based on the wake-up signal from the temperature recorder circuit 310. The sequencer 360 can continuously operate regardless of whether the GPS receiver 130 or navigation device 115 hibernates, similar to the temperature recorder circuit 310 and time reference device 340. The sequencer 360 is adjustable and receives configuration parameters from the memory 325 via the power manager 330 and the processing device 335, when the GPS Receiver is awake.

Figure 4:
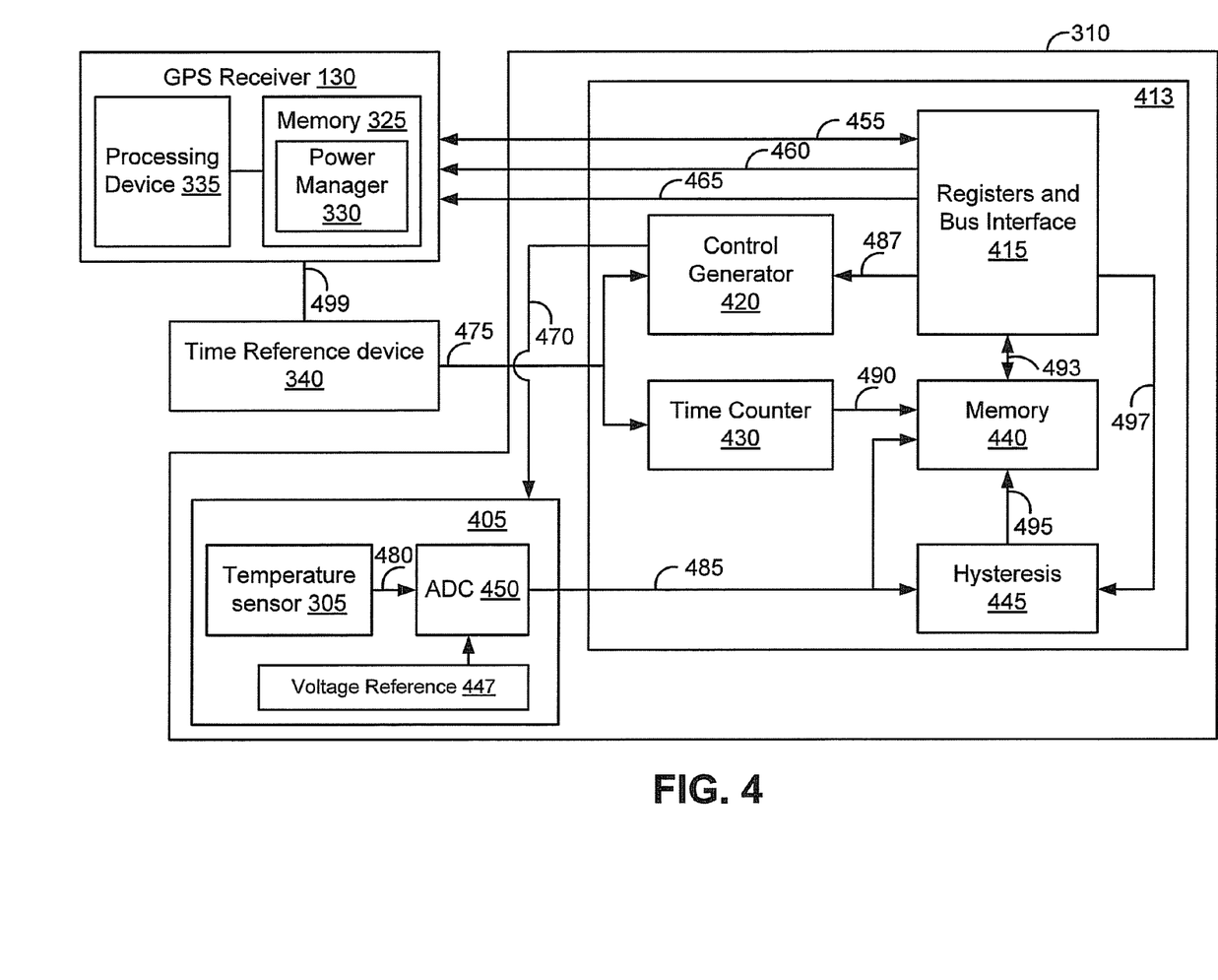
FIG. 4 is a more detailed block diagram that illustrates an embodiment of a temperature recorder circuit, such as that shown in FIG. 3.

FIG. 4 is a more detailed block diagram that illustrates an embodiment of a temperature recorder circuit 310, such as that shown in FIG. 3. The temperature recorder circuit 310 includes an analog section 405 and a digital section 413. The analog section 405 includes a temperature sensor 305 that is coupled to an analog-to-digital converter (ADC) 450. The temperature sensor 305 senses the temperature of the time reference device 340 or the frequency reference device 350 and generates data associated with a temperature change of the time reference device 340 or the frequency reference device 350 at line 480. The ADC 450 receives the generated data at line 480 from the temperature sensor 305 and converts the data from analog signals to digital signals at line 485.

The temperature sensor 305 can be located on the time and frequency reference devices 340, 350, or in close proximity to the time and frequency reference devices 340, 350 so that the temperature sensor 305 can accurately measure the temperature of the time and frequency reference devices 340, 350. Alternatively there may be two temperature sensors 305 each to measure the time reference device 340 and the frequency reference device 350, using either two ADC's or one ADC with multiplexed input. The temperature sensor 305 and ADC 450 can be designed to measure the temperature of the time and frequency reference devices 340, 350 at an update rate, regardless of whether the system is operating or hibernating.

The ADC 450 can be coupled to a switched differential proportional to absolute temperature (PTAT) voltage reference 447 that is designed to be bypassed with switches and fed a constant voltage to the ADC 450. The switched PTAT voltage reference 447 stores the result in memory 440 with a point of pure reference curvature at the applied temperature to correct an $N^{th}$, e.g. $2^{nd}$, order dependence of the switched PTAT voltage reference 447. Alternatively or additionally, the switched PTAT voltage reference 447 is further designed to switch back in and subtract a resulting conversion from the earlier stored code. The switched PTAT voltage reference 447 can repeat the subtraction each time without having to re-compute the pure reference curvature.

A control generator 420 receives clock signals at line 475 from the time reference device 340 and can change a measurement rate of the temperature sensor 305 at line 470 based on the clock signal 475. A time counter 430 also receives the clock signals at line 475 from the time reference device 340 and generates data associated with the GPS receiver time at line 490. The memory 440 of the temperature recorder circuit 310 receives and stores, for example, the GPS receiver time from the time counter 430 at line 490 and sensed temperature data from the ADC 450 at line 485.

A hysteresis circuit 445 receives real-time data associated with the temperature from the ADC 450 at line 485, compares it with the most recent previous temperature sent to memory 440, and determines whether the memory 440 stores the real-time data at line 485. The hysteresis circuit 445 can instruct the memory 440 at line 495 to store the real-time data at line 485 based on the temperature change. Alternatively or additionally, the hysteresis circuit 445 can be designed to reduce the instances in which electrical circuit noise causes a memory access, rather than a real temperature change. Additionally, the hysteresis circuit 445 is designed to receive a hysteresis threshold, at line 497, from the register and bus interface 415. The hysteresis circuit 445 is further designed to store the current temperature value in memory 440, responsive to any change in temperature exceeding the hysteresis threshold. Storage event can be programmed to cause memory 440 to signal register and bus interface 415 which then executes an interrupt to the GPS receiver 130 if the GPS receiver 130 is powered on or sequencer 360 if the GPS receiver 130 is in hibernate mode.

The time value from the time counter 430 at line 490 is stored in memory 440 to be associated with the stored temperature or implied temperature change. The registers and bus interface 415 receives data from the memory 440 of the temperature recorder circuit 310 or First in First out (FIFO) implemented in memory 440 at line 493.

The registers and bus interface 415 can receive wake up signals from the hysteresis circuit 445 or the memory 440, and send an interrupt signal 460 onward to the GPS receiver 130, based on at least one of the following data: hysteresis threshold exceeded in the hysteresis circuit 445, FIFO programmable fill level being exceeded in memory 440, the memory 440 being full, sensed temperature, data associated with the GPS receiver time, or temperature change. The processing device 335 generally has access through the memory 440 of the temperature recorder circuit 310 to the receiver time and temperature that caused the event. Alternatively or addition, if the option for receiver time alone is meant to imply a wake alarm from the time reference device 340, the GPS receiver 130 can be configured to be able to distinguish the time alarm, so that appropriate action can be taken.

Alternatively or additionally, the FIFO fill depth can be set by a processing device 335 so that the wake-up signal can be sent before memory 440 is actually full. As such, the temperature recorder circuit 310 can wake up the GPS receiver 130 or navigation device 115 at or before a certain temperature change has occurred. The temperature change may be less, but not more than the temperature change implied by the fill level. If the FIFO uses the memory 440 with write and read pointers, then the FIFO generally triggers the empty signal or the full signal when a read pointer points to a write pointer address or the write pointer points to the read pointer address, respectively.

The registers and bus interface 415 communicates configuration commands and/or data between the memory 325 and the processing device 335. The registers and bus interface 415 facilitates initialization of the temperature recorder circuit 310 by, for example, sending initialization data at line 487 to the control generator 420. The initialization data includes, but is not limited to, control enable instruction, warm-up period instruction, and temperature recorder circuit 310 enable instruction, among others. It should be noted that a temperature recorder circuit 310 that has a fixed and unchangeable configuration may not need any initialization.

In this example, the processing device 335 of the GPS receiver 130 communicates with the temperature recorder circuit 310 using the interface bus at line 455. The processing device 335 of the GPS receiver 130 is electrically coupled to the time reference device 340 to receive the clock signals at line 499. The clock signal at line 475 runs the time counter 430 that has stored receiver time while the navigation system 115 was off. This receiver time is the local estimate of GPS system time and is used to initialize the receiver timing to allow more rapid acquisition of GPS signals. Once acquired, the GPS signals are used to make pseudo-range measurements (e.g., range measurements biased by the error in the local receiver time relative to true GPS system time) from the GPS receiver 130 to the several satellites 105, 110, 113, 114. These measurements are then used to calculate the position and time error by the processing device 335 at the GPS receiver 130. It should be noted that the temperature recorder circuit 310 can be coupled with any electrical components of the GPS receiver 130 or navigation device 115 and can wake up the GPS receiver 130 or other devices.

Figure 5:
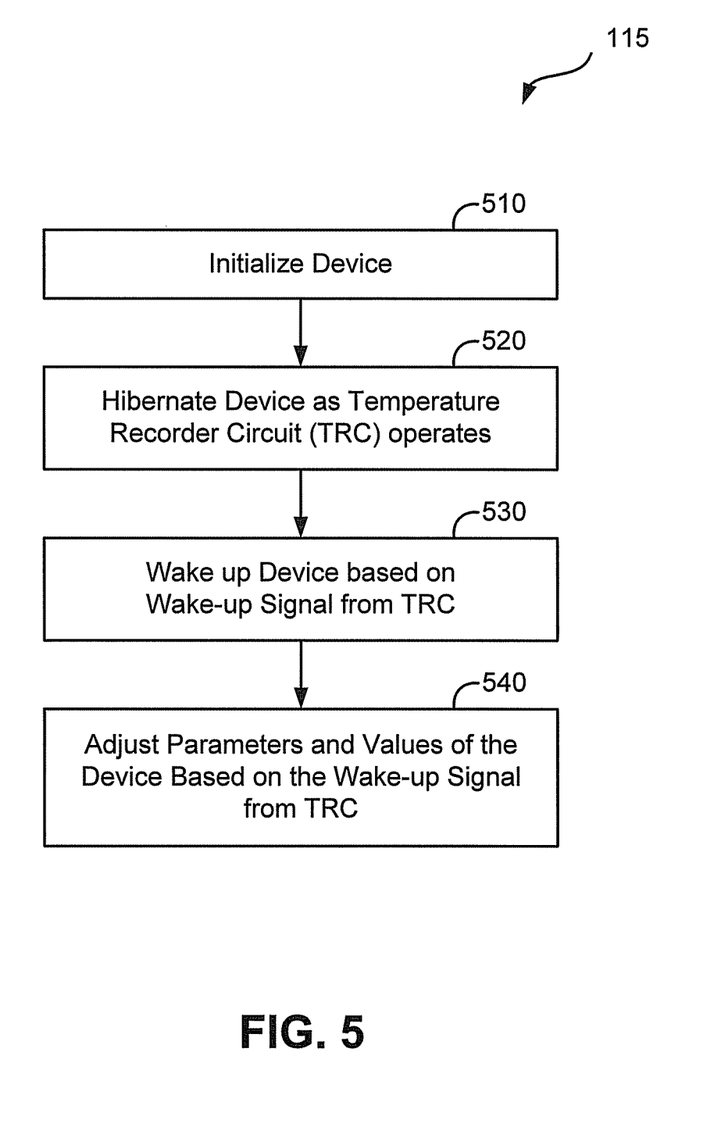
FIG. 5 is a high-level flow diagram that illustrates an embodiment of the architecture, functionality, and/or operation of the navigation device 115, such as that shown in FIG. 1, which that manages its power consumption using a temperature recorder circuit and a power manager.

FIG. 5 is a flow diagram that illustrates an embodiment of the architecture, functionality, and/or operation of the navigation device 115, such as that shown in FIG. 1, which manages its power consumption using a temperature recorder circuit 310 and a power manager. Beginning with steps 510 and 520, the navigation device 115 initializes the electrical components of the navigation device 115 and can be configured to hibernate as the temperature recorder circuit 310 and time reference device 340 operates. In step 530, the temperature recorder circuit 310 sends a wake-up signal to some electrical components of the navigation device 115, waking up the electrical components. In step 530 and 540, the power manager 330 receives the wake-up signal and other data from the temperature recorder circuit 310 and adjusts parameters and values associated with some electrical components of the navigation device 115 based on the received wake-up signal and data. The electrical components can include, but are not limited to, the time reference device 340, the frequency reference device 350 and the temperature recorder circuit 310.

Figure 6:
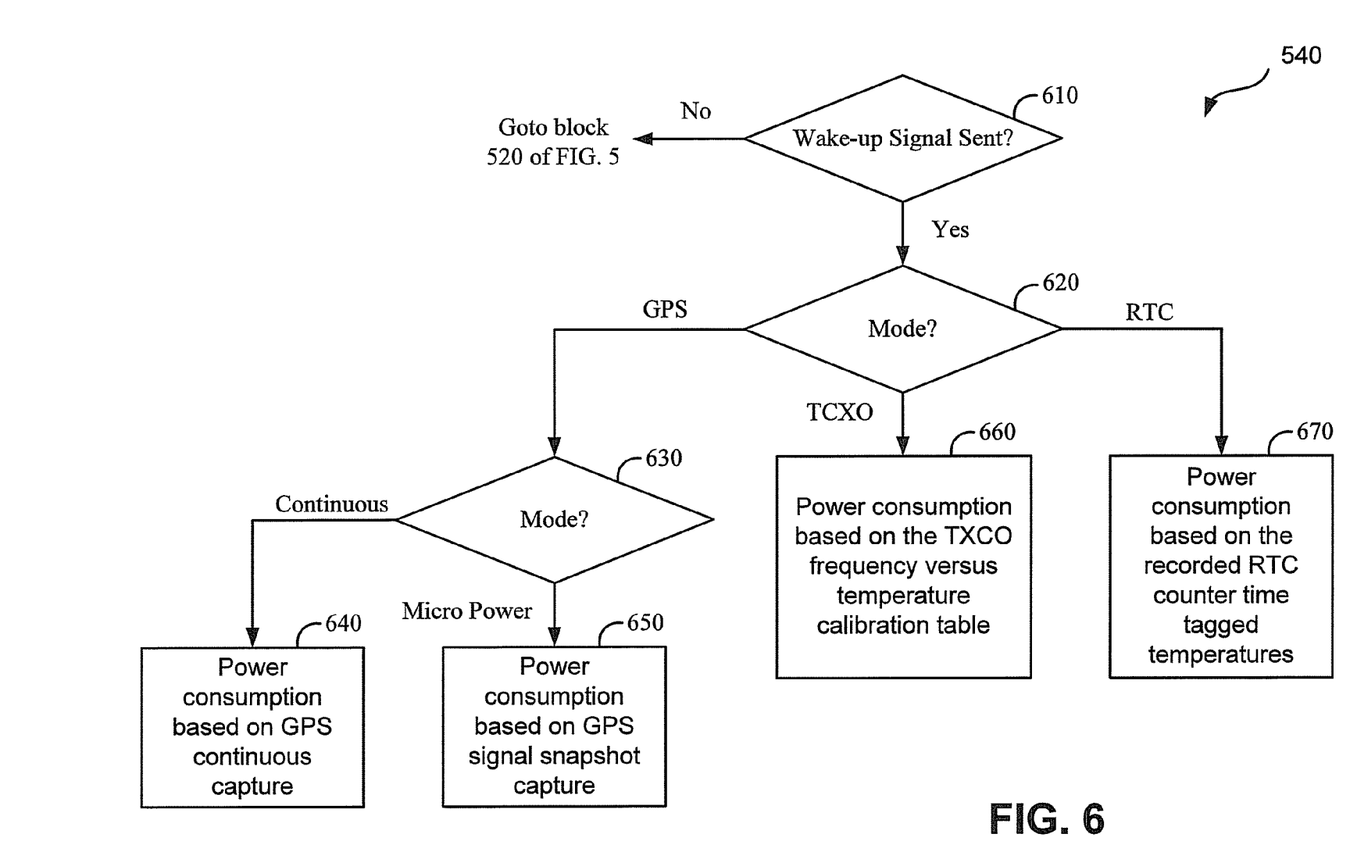
FIG. 6 is a flow diagram that illustrates an embodiment of the architecture, functionality, and/or operation of a power manager, such as that shown in FIGS. 3 and 4, for adjusting parameters and values of a GPS navigation device, such as that shown in step 540 of FIG. 5.

FIG. 6 is a flow diagram that illustrates an embodiment of the architecture, functionality, and/or operation of a power manager 330, such as that shown in FIGS. 3 and 4, for adjusting parameters and values of a GPS navigation device 115, such as that shown in step 540 of FIG. 5. Beginning with step 610, the power manager 330 determines whether a wake-up signal was sent, and if not, the navigation device 115 continues to hibernate as the temperature recorder circuit 310 operates, such as that shown in step 520 of FIG. 5. If the power manager 330 determines that the wake-up signal was sent, the power manager 330, at step 620, determines the mode of operation that manages the power consumption of the navigation device 115. The power consumption mode of operation is determined based on current estimate of uncertainty in position, time, frequency and ephemeris validity, where time is generally the dominate variable, since time is by far the most perishable of the quantities. The mode of operation is also based on determining the lowest power path with the longest possible hibernation of the navigation device 115 until wake up.

If the power manager 330 determines that the mode of operation is based on GPS signal capture, the power manager 330, at step 630, determines whether to manage the power consumption of the navigation device 115 based on GPS continuous capture, or based on GPS signal snapshot capture, which are indicated in steps 640 and 650, respectively. At step 620, the power manager 330 further determines whether to manage the power consumption of the navigation device 115 based on a TXCO frequency versus temperature calibration table, or based on recorded RTC counter time tagged temperatures, which are indicated at steps 660 and 670, respectively. Steps 640, 650, 660, and 670 are further description in FIGS. 10, 9, 8 and 7, respectively.

Figure 7:
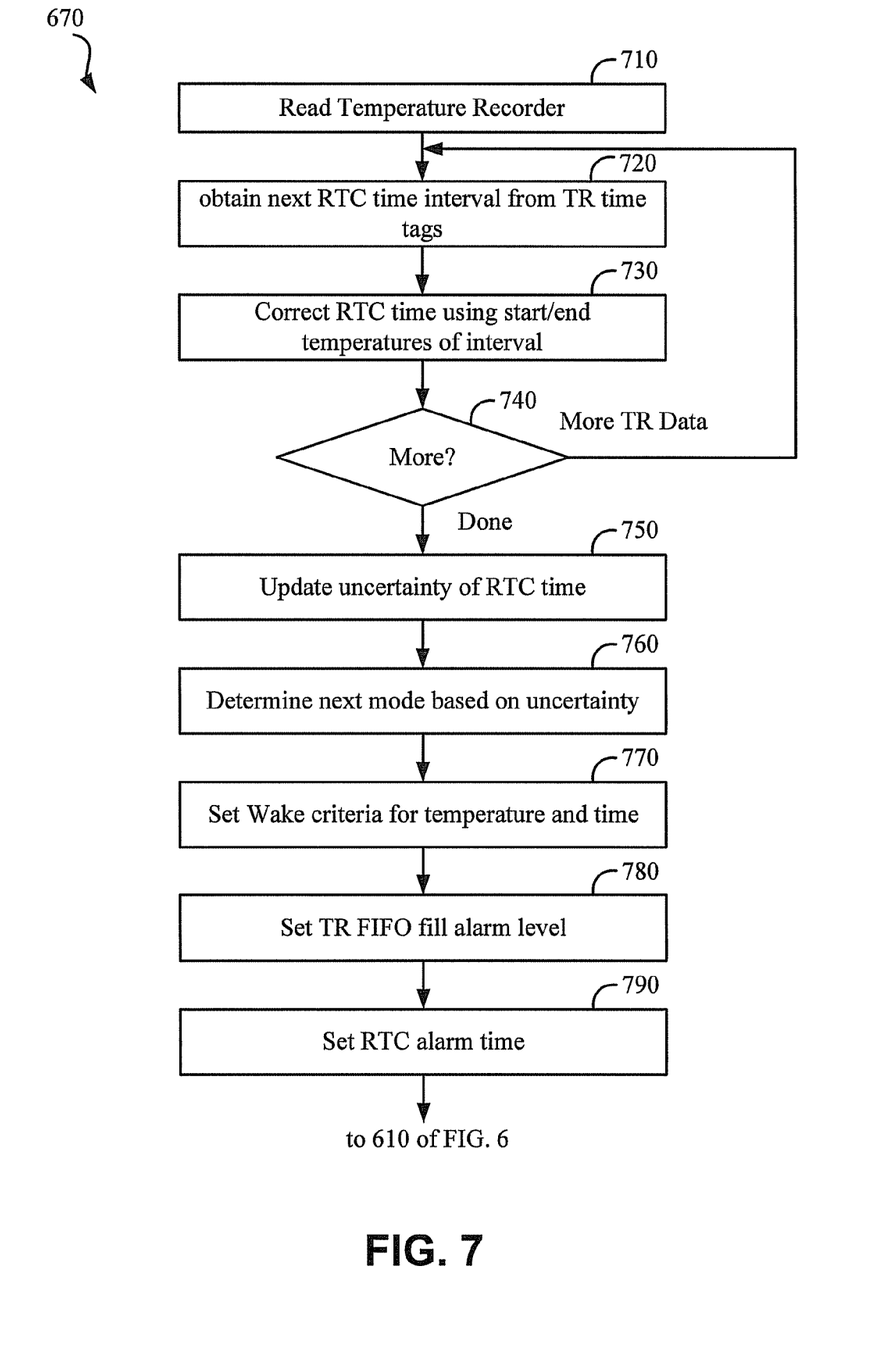
FIG. 7 is a flowchart that illustrates an embodiment of the architecture, functionality, and/or operation of a power manager, such as that shown in FIGS. 3 and 4, for managing the power consumption of the navigation device based on the recorded real time clock (RTC) counter time tagged temperatures, such as that shown in step 670 of FIG. 6.

FIG. 7 is a flowchart that illustrates an embodiment of the architecture, functionality, and/or operation of a power manager 330, such as that shown in FIGS. 3 and 4, for managing the power consumption of the navigation device 115 based on the recorded RTC counter time tagged temperatures, such as that shown in step 670 of FIG. 6. Beginning with step 710, the power manager 330 reads data from the temperature recorder circuit 310. At steps 720 and 730, the power manager 330 obtains the next RTC time interval from the temperature recorder time tags and corrects the RTC time using start/end temperatures of interval, respectively.

At step 740, the power manager 330 determines whether to obtain more temperature recorder data, and if so, repeat steps 720 and 730. If the power manager 330 determines that sufficient data was obtained, the power manager 330, at steps 750 and 760, updates uncertainty of the RTC time and determines the next mode based on uncertainty, respectively. At steps 770 and 780, the power manager 330 sets the wake criteria for temperature and time, and sets the temperature recorder FIFO fill alarm level, respectively. At step 790, the power manager 330 sets the RTC alarm time and goes to step 610 of FIG. 6.

Step 670 takes full advantage of the ability of the temperature recorder circuit 310 to record RTC counter time tagged temperatures over an extended time, for example, several minutes. In order to use step 670, the power manager 330 calibrates the RTC oscillator frequency versus temperature. Then, when the wake event occurs, generally due to the FIFO in the temperature recorder circuit 310 having reached a programmed fill point, the number of measurements spans some number of time segments between these measurement points. For each RTC time segment defined by adjacent time tagged temperatures, the power manager 330 can estimate the accumulated error in the RTC time due to the temperature change by using the RTC frequency versus temperature calibration table. Thus, segment by segment, the power manager 330 can correct the current RTC time.

One of the advantages, among others, of step 670 is the infrequent wake intervals that allow correcting the elapsed RTC time as a batch of corrections. In this case, the TCXO or ratio counter generally does not turn on. Only the processing device 335 is run and the corrections can be calculated in, for example, some few hundred micro seconds at very low expended average power.

Another disadvantage, among others, of step 670 is that the RTC frequency versus temperature curve is a parabolic shape. Near room temperature this curve is quite flat in shape, but at temperature extremes, either hot of cold, the curve is quite steep. Thus, at the temperature extremes the calibration is sensitive to temperature and not as precise as the calibration method in step 660, which will further be described in related to FIG. 8. Hence, depending on absolute temperature, the power manager 330 may prefer to program either step 660 or step 670 as the next wake mode.

Figure 8:
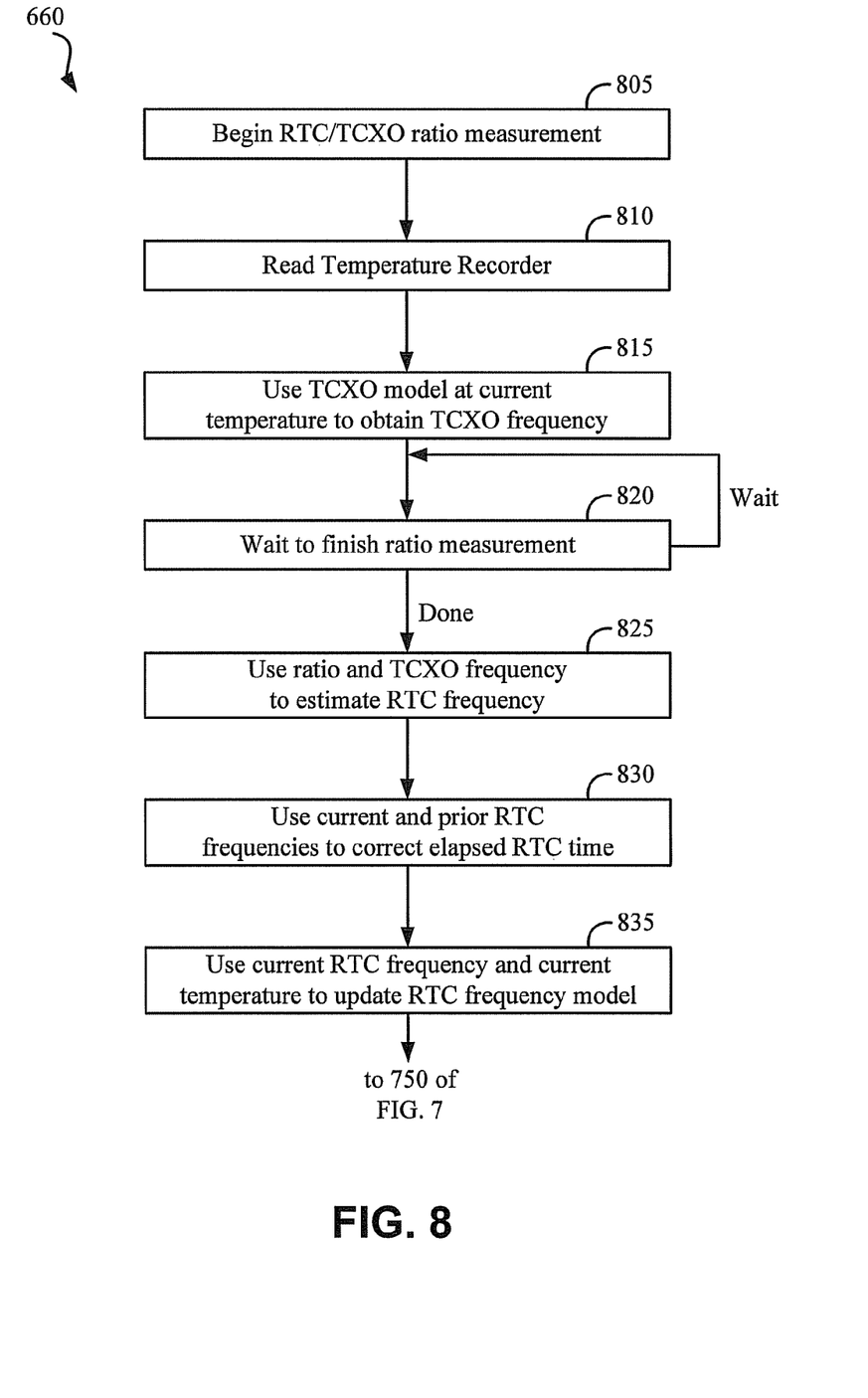
FIG. 8 is a flow diagram that illustrates an embodiment of the architecture, functionality, and/or operation of a power manager, such as that shown in FIGS. 3 and 4, for managing the power consumption of the navigation device, such as that shown in step 660 of FIG. 6.

FIG. 8 is a flow diagram that illustrates an embodiment of the architecture, functionality, and/or operation of a power manager 330, such as that shown in FIGS. 3 and 4, for managing the power consumption of the navigation device 115, such as that shown in step 660 of FIG. 6. Beginning with steps 805 and 810, the power manager 330 begins the RTC/TCXO ratio measurement and reads data from the temperature recorder circuit 310, respectively.

At steps 815 and 820, the power manager 330 uses a TCXO model at current temperature to obtain the TCXO frequency and waits to finish the ratio measurement, respectively. Once the power manager 330 finishes the ratio measurement, the power manager 330, at step 825, uses the ratio measurement and TCXO frequency to estimate the RTC frequency. At steps 830 and 835, the power manager 330 uses the current and prior RTC frequencies to correct elapsed RTC time, and uses current RTC frequency and current temperature to update an RTC frequency versus temperature model, respectively. The power manager 330 then goes to step 750 of FIG. 7 to complete the power management process of step 660 of FIG. 6.

Figure 9:
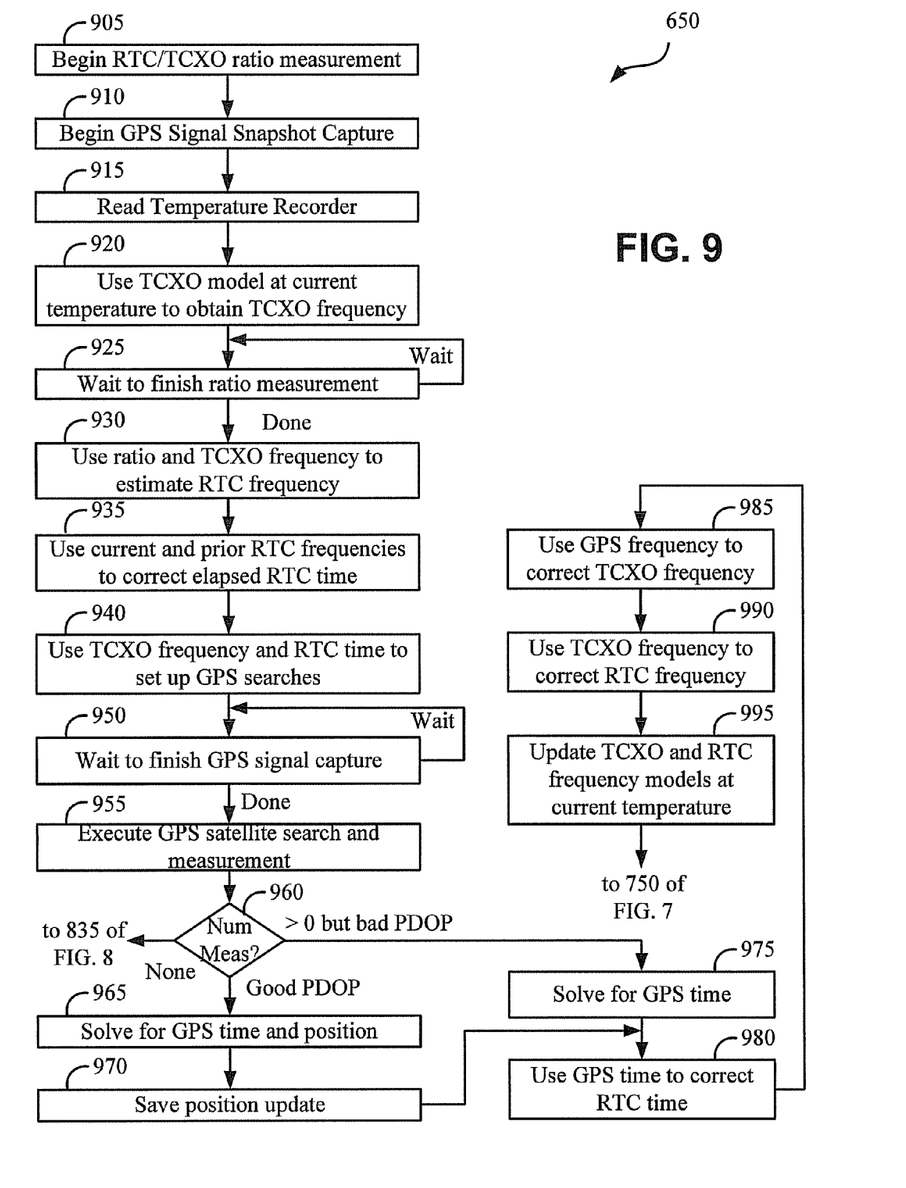
FIG. 9 is a flow diagram that illustrates an embodiment of the architecture, functionality and/or operation of a power manager, such as that shown in FIGS. 3 and 4, for managing the power consumption of the navigation device, such as that shown in step 650 of FIG. 6.

Step 660 is a path that uses lower power than step 650, which will further be described in related to FIG. 9. In this case, the TCXO frequency versus temperature calibration table is used to calibrate the RTC frequency via the circuit that measures the ratio between RTC and TCXO frequency. Given this RTC frequency estimate and the prior estimate from the previous wake event, the power manager 330 can scale the elapsed RTC time to correct its current value relative to GPS system time.

In step 660, the power manager 330 can run the TCXO, the RTC, the ratio measurement circuits and the system processing device 335 (FIG. 3), and hibernate the rest of the electrical components of the navigation device 115. Further, the processing device 335 (FIG. 30) generally operates at a very low duty cycle during the wake event. The wake event in this case is generally a change in the temperature sensed by the temperature recorder circuit 310. The change in temperature sensed can be a single recorded temperature with a change of, for example, one LSB of the sensor A/D. If the sensed temperature is very stable, the wake events may be spaced quite far apart in time. Whereas if the temperature is changing rapidly, the wake up events may occur as often as, for example, once per second.

FIG. 9 is a flow diagram that illustrates an embodiment of the architecture, functionality and/or operation of a power manager 330, such as that shown in FIGS. 3 and 4, for managing the power consumption of the navigation device 115, such as that shown in step 650 of FIG. 6. Beginning with steps 905 and 910, the power manager 330 begins the RTC/TCXO ratio measurement and begins the GPS signal snapshot capture, respectively. At steps 915 and 920, the power manager 330 reads data from the temperature recorder circuit 310, and uses a TCXO model at current temperature to obtain the TCXO frequency, respectively.

At step 925, the power manager 330 waits to finish the ratio measurement, and once done, at steps 930 and 940, the power manager 330 uses the ratio measurement and TCXO frequency to estimate the RTC frequency, and uses the TCXO frequency and corrected RTC time to set up the GPS searches, respectively. At steps 950 and 955, the power manager 330 waits to finish the GPS signal capture, and once done, executes the GPS satellite search and measurement, respectively. At step 960, the power manager 330 determines the number of GPS measurements. If there is no GPS measurement, the power manager 330 goes to step 835 of FIG. 8. If the number of measurement is greater than zero but there is a bad position dilution of precision (PDOP), the power manager 330, at step 975, solves for the GPS time only. If the number of measurements has good PDOP, the power manager 330, at steps 965 and 970, solves for the GPS time and position, and saves the time and position updates, respectively.

At steps 980 and 985, the power manager 330 uses the GPS navigation solution time to correct the RTC time and uses the GPS navigation solution frequency to correct TCXO frequency, respectively. At steps 990 and 995, the power manager 330 uses the TCXO frequency to correct the RTC frequency and updates the TCXO and RTC frequency models at the current temperature, respectively. The power manager 330 then goes to step 750 of FIG. 7 to complete the power consumption management process of step 650 of FIG. 6. It should be noted that step 650 operates at far lower power (e.g., about 50× lower) than continuous mode in step 640, which will further be described in relation to FIG. 10. Step 640 captures GPS RF samples for a short time, e.g., on the order of 100 ms, rather than continuously for 18 seconds as in step 640. The navigation device 115 then attempts to detect GSP signals in these samples and make range measurements to the satellites detected. Step 650 may provide from 0 to several range measurements to the various satellites 105, 110, 113, 114 currently above the horizon at the receiver location.

Under good conditions, there may be enough satellites 105, 110, 113, 114 providing good geometry (e.g., so-called PDOP<10) that the GPS navigation equations can be solved for position and time. This provides the highest quality opportunity to calibrate TCXO and RTC frequencies at the current temperature, correct the RTC time to GPS accuracy, and update the position. However, step 650 can address very difficult environments such as deep indoor locations, where there may be few, if any, measurements possible.

If at least one measurement can be made, the navigation device 115 can solve the GPS navigation equations by assuming that the navigation device 115 is stationary (a good approximation when indoors) and update the GPS time. That is with one measurement the power manager 330 can solve for one unknown, the GPS time. If there are no GPS measurements possible, the power manager 330 can use the existing TCXO calibration table or model to correct RTC time in order to preserve low RTC time uncertainty as long as possible.

Step 650, while using lower power than step 640, is generally used sparingly. For example, the wake interval is at least 60 seconds between the wake events which last only 200-300 ms.

Figure 10:
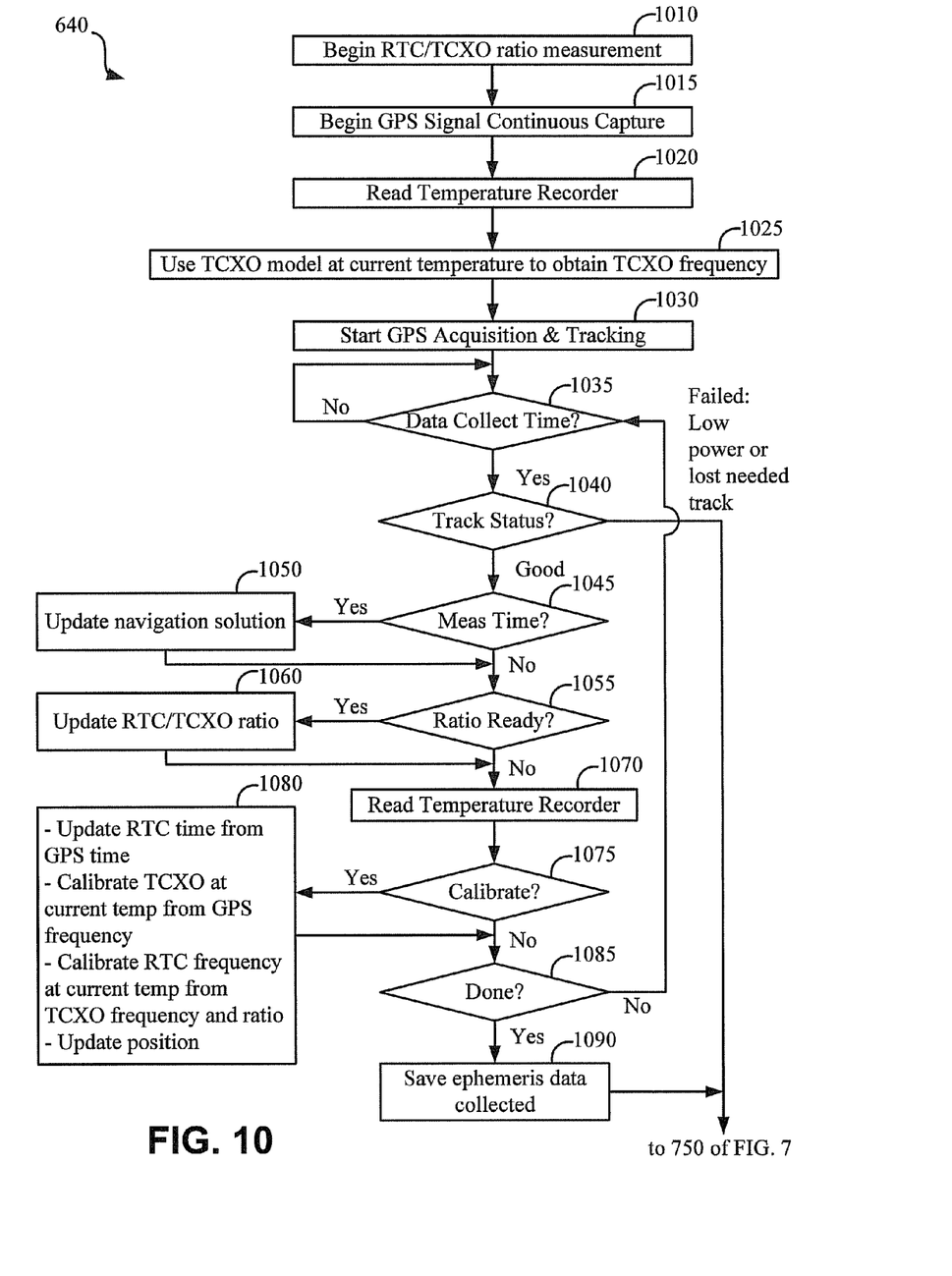
FIG. 10 is a flow diagram that illustrates an embodiment of the architecture, functionality, and/or operation of a power manager, such as that shown in FIGS. 3 and 4, for managing power consumption of a navigation device, such as that shown in step 640 of FIG. 6.

FIG. 10 is a flow diagram that illustrates an embodiment of the architecture, functionality, and/or operation of a power manager 330, such as that shown in FIGS. 3 and 4, for managing power consumption of a navigation device 115, such as that shown in step 640 of FIG. 6. Beginning with steps 1010 and 1015, the power manager 330 begins the RTC/TCXO of measurement and begins the GPS signal continuous capture, respectively. At steps 1020 and 1025, the power manager 330 reads the data from the temperature recorder circuit 310 and uses a TCXO model at current temperature to obtain the TCXO frequency, respectively.

At steps 1030 and 1035, the power manager 330 starts the GPS acquisition and tracking, and determines whether the correct time to begin collecting relevant GPS navigation data has arrived, respectively. If the proper time to collect the relevant GPS navigation data has not yet arrived, the power manager 330 continues to repeat step 1015. If the correct time to collect the relevant navigation data has arrived, the power manager 330, at step 1040, determines the track status of the satellites for collecting the relevant GPS navigation data; e.g., satellites 105, 110, 113, 114. If the tracking fails for the tracked satellites due to, e.g., low power or loss of signal, then the power manager 330 goes to step 750 of FIG. 7 to avoid wasting power when successful data collection is not possible. If the track status is determined to be good, the power manager 330 at step 1045 determines if satellite range measurement time has arrived. If measurement time has arrived, the power manager 330, at step 1050, acquires the range measurements, updates the navigation solution and goes to step 1055. If the measured time cannot be obtained, the power manager 330 also goes to step 1055 to determine whether the ratio measurement is ready. If the ratio measurement is ready, the power manager 330, at step 1060, updates the RTC/TCXO ratio and goes to step 1070. If the ratio is not ready, the power manager 330 also goes to 1070 to read the data from the temperature recorder circuit 310.

At step 1075, the power manager 330 determines whether to calibrate various GPS parameters and values. If so, the power manager 330, at step 1080, for example, updates the RTC time from the GPS time, calibrates the TCXO at current temperature from GPS frequency, calibrates the RTC frequency at current temperature from TCXO frequency and ratio, and updates the position. If the power manager 330 determines not to calibrate the various GPS parameters and values, the power manager 330, at step 1085, determines whether the process is done, having collected the relevant navigation data from the tracked satellites. If the process is not done, then the power manager 330 repeats steps 1035 through 1085. If the process is determined to be complete, the power manager 330, at step 1090, saves the ephemeris data collected and then goes to step 750 of FIG. 7.

Step 640 is the highest power consumption path among steps 650, 660 and 670. Step 640 is generally used when the navigation device 115 is forced to collect ephemeris data from one or more satellites. This can occur, for example, twice per hour with a wake time of slightly more than 18 seconds each time. The reason for the wake time is that the ephemeris data from satellites is transmitted, for example, in three (3) sub-frames of six (6) seconds each for a total time of 18 seconds. In some systems, step 640 can be used as infrequently as every few hours when the so-called extended ephemeris algorithm is being used.

When operating in step 640, it should be noted that while collecting data from satellites, the power manager 330 can also, at no significant additional cost in power, update the current position and time from GPS measurements by executing the GPS navigation algorithm at step 1050. In addition, based on the GPS solution, the power manager 330 can then update the TCXO frequency, RTC frequency and RTC time with highest accuracy of all the methods enumerated, based on an accurate GPS navigation solution.

Note that if the navigation device 115 loses the ability to track the satellites for which to collect the ephemeris data, the power manager 330 can abort the wake cycle at step 1040 rather than waste power uselessly. In fact, step 640 is generally attempted if the power manager 330 has executed step 650 and that the navigation device 115 has already detected sufficiently strong GPS signals during step 650 to provide a high probability of success will be available to collect ephemeris data from those satellites.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A receiver, comprising:
a time reference device configured to generate a clock signal associated with a Global Positioning System (GPS) system time;
a temperature recorder circuit, coupled to receive the clock signal from the time reference device, and configured to:
monitor the temperature of the time reference device while the receiver hibernates; and
generate a wake-up signal based on the monitored temperature of the time reference device while the receiver hibernates; and
a power manager configured to:
wake up the receiver based on the wake-up signal indicating a change in the monitored temperature while the receiver hibernates;
read the monitored temperature from the temperature recorder circuit; and
adjust at least one member of the group consisting of a parameter of the time reference device, a parameter of a frequency reference device, and a parameter of the temperature recorder circuit.

2. The receiver of claim 1, wherein the power manager is further configured to determine whether to operate the receiver in a mode that is based on at least one member of the group consisting of power consumption based on GPS signal continuous capture, power consumption based on GPS signal snapshot capture, power consumption based on a frequency versus temperature calibration table, and power consumption based on recorded counter time tagged temperatures.

3. The receiver of claim 2, wherein the power manager is further configured to:
update an estimate of timing uncertainty of the clock signal generated by time of the time reference device;
determine the next mode based on the updated estimate of timing uncertainty;
set a wake criteria for temperature and time;
set a temperature recorder First In, First-Out (FIFO) fill alarm level; and
set an alarm time of the time reference device.

4. The receiver of claim 3, wherein the power manager is further configured to obtain a time interval of the time reference device from temperature recorder time tags and to correct the time of the time reference device using start/end temperatures of interval.

5. The receiver of claim 3, wherein the power manager is further configured to begin ratio measurement between the time reference device and the frequency reference device and to use a model associated with the frequency reference device at a current temperature to obtain the frequency of the frequency reference device.

6. The receiver of claim 5, wherein the power manager is further configured to:
wait to finish the ratio measurement;
use the ratio measurement and the obtained frequency of the frequency reference device to estimate the a frequency of the time reference device; and
use frequencies of the time reference device there that were previously and currently obtained to correct elapsed time of the time reference device.

7. The receiver of claim 6, wherein the power manager is further configured to use the current frequency of the time reference device and the current temperature to update a frequency versus temperature model associated with the time reference device.

8. The receiver of claim 6, wherein the power manager is further configured to:
begin the GPS signal snapshot capture;
use the obtained frequency of the frequency reference device and corrected time of the time reference device to set up GPS satellite searches;
wait to finish the GPS signal snapshot capture;
perform the GPS satellite search and process GPS measurements; and determine the number of GPS measurements.

9. The receiver of claim 8, wherein the power manager is further configured to solve for determine the GPS system time based the number of GPS measurements being greater than zero and an unusable position dilution of precision (PDOP).

10. The receiver of claim 8, wherein the power manager is further configured to solve for determine the GPS system time and a GPS position and to save the GPS system time and GPS position updates based on the number of GPS measurements having usable PDOP.

11. The receiver of claim 10, wherein the power manager is further configured to:
use a GPS navigation solution time to correct the time of the time reference device;
use a GPS navigation solution frequency to correct the frequency of the frequency reference device;
use the frequency of the frequency reference device to correct the frequency of the time reference device; and
update frequency models associated with the time reference device and the frequency reference device at the current temperature.

12. The receiver of claim 5, wherein the power manager is further configured to:
begin the GPS signal continuous capture;
start a GPS acquisition and tracking; and
determine whether the correct time to begin collecting relevant GPS navigation data has arrived.

13. The receiver of claim 12, wherein the power manager is further configured to:
determine a track status of satellites for collecting the relevant GPS navigation data based on an arrival of the correct time to collect the relevant GPS navigation data; and
determine if a satellite range measurement time has arrived based on the track status being usable.

14. The receiver of claim 13, wherein the power manager is further configured to acquire the satellite range measurements, to update a navigation solution, and to determine whether the ratio measurement is ready based on an arrival of the satellite range measurement time.

15. The receiver of claim 14, wherein the power manager is further configured to update the ratio measurement, read the data from the temperature recorder circuit, and determine whether to calibrate various GPS parameters and values based on the ratio measurement being ready.

16. The receiver of claim 15, wherein the power manager is further configured, based on a determination to calibrate the various GPS parameters and values, to:
update the time of the time reference device from the GPS system time;
calibrate the frequency reference device at the current temperature from the GPS frequency;
calibrate a frequency of the time reference device at the current temperature from the frequency of the frequency reference device and the ratio measurement;
update a GPS position; and
save collected ephemeris data.

17. A computing device comprising:

a receiver;

a temperature recorder circuit configured to generate a wake-up signal based on a monitored temperature of a time reference device while the receiver hibernates;

a processing device; and a memory configured to store instructions that, when executed by the processing device, causes the computing device to:

wake up the receiver based on the wake-up signal indicating a change in the monitored temperature while the receiver hibernates;

read the monitored temperature from the temperature recorder circuit; and adjust at least one member of the group consisting of a parameter of the a time reference device, a parameter of a frequency reference device, and a parameter of the temperature recorder circuit.

18. The computing device of claim 17, wherein execution of the instructions causes the computing device to operate the receiver in a mode that is based on at least one member of the group consisting of power consumption based on Global Positioning System (GPS) continuous capture, power consumption based on GPS signal snapshot capture, power consumption based on a frequency versus temperature calibration table, and power consumption based on recorded counter time tagged temperatures.

19. A method of operating a receiver, comprising:

generating, using a time reference device, a clock signal associated with a Global Positioning System (GPS) system time using a time reference device;

monitoring the temperature of the time reference device while the receiver hibernates;

generating a wake-up signal based on the monitored temperature of the time reference device while the receiver hibernates;

waking up the receiver based on the wake-up signal indicating a change in the monitored temperature while the receiver hibernates;

reading the monitored temperature; and adjusting at least one member of the group consisting of a parameter of the time reference device, a parameter of a frequency reference device, and a parameter of a temperature recorder circuit configured to monitor the temperature of the time reference device.

20. The method of claim 19, further comprising:

determining whether to operate the receiver in a mode that is based on at least one member of the group consisting of power consumption based on GPS signal continuous capture, power consumption based on GPS signal snapshot capture, power consumption based on a frequency versus temperature calibration table, and power consumption based on recorded counter time tagged temperatures.

* * * * *